(12) United States Patent
Takeshita et al.

(10) Patent No.: US 6,212,317 B1
(45) Date of Patent: Apr. 3, 2001

(54) METHOD OF MANUFACTURING COLOR FILTER AND DEVICE OF MANUFACTURING THE SAME

(75) Inventors: Naoki Takeshita; Kaoru Ikeda; Yuzo Hayashi, all of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/199,501

(22) Filed: Nov. 25, 1998

(30) Foreign Application Priority Data

Nov. 27, 1997 (JP) .................................... 9-326359

(51) Int. Cl.$^7$ ................ B41J 2/455; G02B 6/32
(52) U.S. Cl. ................ 385/33; 347/51; 347/88; 385/147
(58) Field of Search .................. 385/15, 31, 33–35, 385/147; 372/108, 109; 347/51, 56, 61, 88, 99, 101

(56) References Cited

U.S. PATENT DOCUMENTS

| | | | |
|---|---|---|---|
| 4,369,451 | * | 1/1983 | Sekido et al. ............ 347/225 |
| 5,578,824 | * | 11/1996 | Koguchi et al. .......... 250/318 |
| 5,711,226 | * | 1/1998 | Harry et al. ............. 101/488 |
| 6,037,968 | * | 3/2000 | Emge et al. ............. 347/260 |

FOREIGN PATENT DOCUMENTS

| | | | |
|---|---|---|---|
| 4-201485 | * | 7/1992 | (JP) . |
| 08194106 | | 7/1996 | (JP) . |
| 61-252501 | | 11/1996 | (JP) . |

* cited by examiner

*Primary Examiner*—John D. Lee
(74) *Attorney, Agent, or Firm*—Brinks Hofer Gilson & Lione (57) ABSTRACT

The device of manufacturing a color filter relating to the invention is provided with a laser irradiation device, in which the condensing lenses are spaced with a pitch whereby a color pattern of the same color of R, G, B can be formed, and are disposed so as to shift positions toward a scanning direction. Further, the laser generation unit of the laser irradiation device has coils made by the optical fibers being curled on the paths, which expand the wavelength band near the center of the laser beams, thus unifying the energy intensity of the part where the laser beams are irradiated. Further, the head unit of the laser irradiation device is provided with cooling means to control the temperature in the head, which prevents displacements in the arrangement pitches of the optical fibers.

19 Claims, 7 Drawing Sheets

METHOD OF MANUFACTURING COLOR FILTER AND DEVICE OF MANUFACTURING THE SAME

BACKGROUND OF THE INVENTION

1. Field of the Invention

The present invention relates to a method of manufacturing a color filter used for a color liquid crystal display cell and a device of the same, specially to a method of manufacturing a color filter that will not generate a transfer displacement and a device of manufacturing the same.

2. Description of the Related Art

Figure 9:
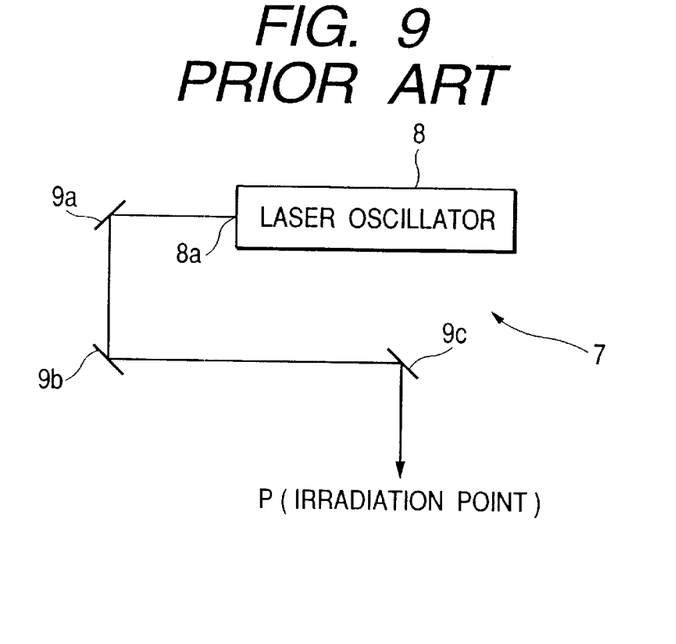
FIG. 9 is a schematic illustration of a conventional laser irradiation device.
Figure 10:
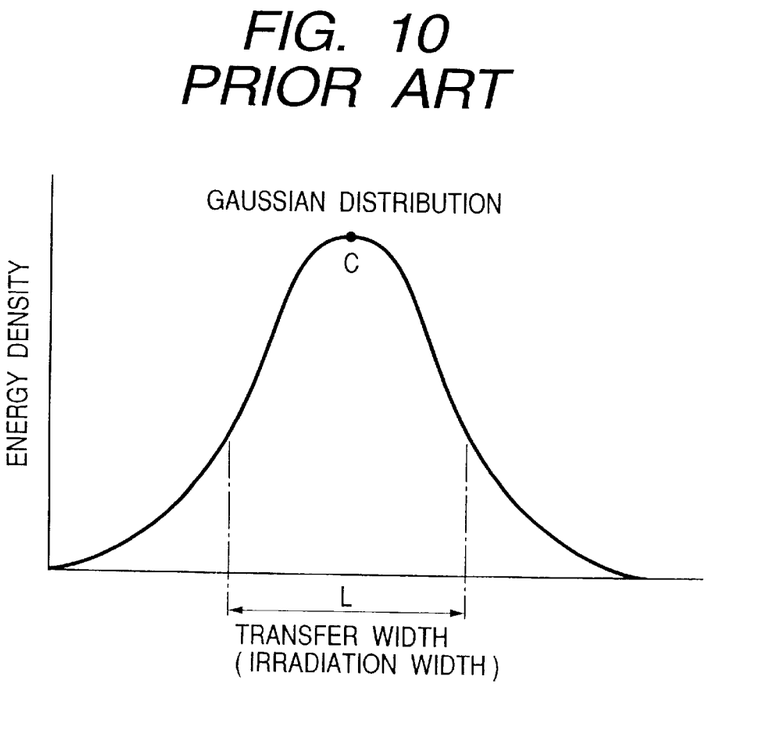
FIG. 10 is a graph to illustrate a relation between the transfer width and the energy density in the conventional laser irradiation device.

FIG. 9 is a schematic illustration of a conventional laser irradiation device 7. And, FIG. 10 is a graph to illustrate a relation between the irradiation width of laser beams radiated from the laser irradiation device 7 and the energy density (intensity) thereof.

The laser irradiation device 7 as shown in FIG. 9 includes a laser oscillator 8 in which semiconductor devices are incorporated, and a single axis laser beam radiated from an outgoing beam aperture 8a of this laser oscillator 8 is reflected by mirrors 9a, 9b, and 9c in this order, and guided to an irradiation point P.

Figure 6:
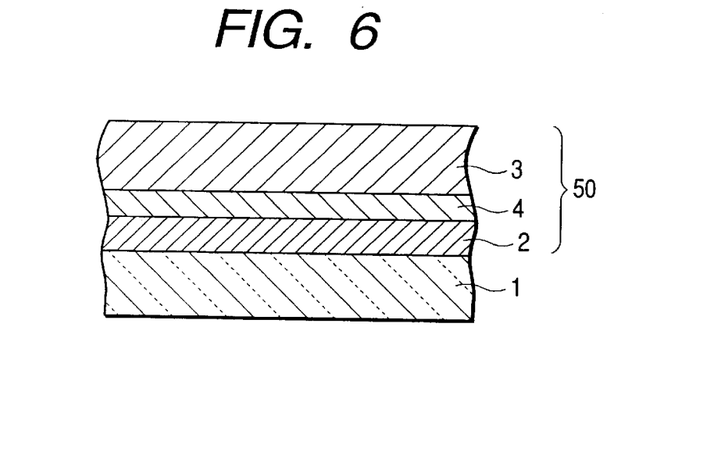
FIG. 6 is an illustration of a state in which a color film sheet is disposed in a tight contact on a color transfer support.

By using this type of the laser irradiation device 7, laser beams are irradiated on a color film sheet 50, as shown in FIG. 6, which is disposed on a color transfer support 1 of a glass substrate or the like, whereby a color filter is formed.

The color film sheet 50 includes a base film 3, photothermal conversion layer 4, and color ink layer 2, which are laminated in this order. The base film 3 employs a drawn resin of a polyethylene terephthalate (PET) or the like. The photothermal conversion layer 4 employs a mixture of a resin binder and a carbon powder, which has the property to absorb light and convert it into heat. The color ink layer 2 employs a resin binder with a pigment added thereto, which assumes one of the three kinds of colors, R (red), G (green), and B (blue).

The foregoing color film sheet 50 is disposed in a tight contact on a color transfer support 1 shown in FIG. 6, laser beams are irradiated locally from above the base film 3, and the color ink layer 2 is transferred onto the color transfer support 1.

Figure 11:
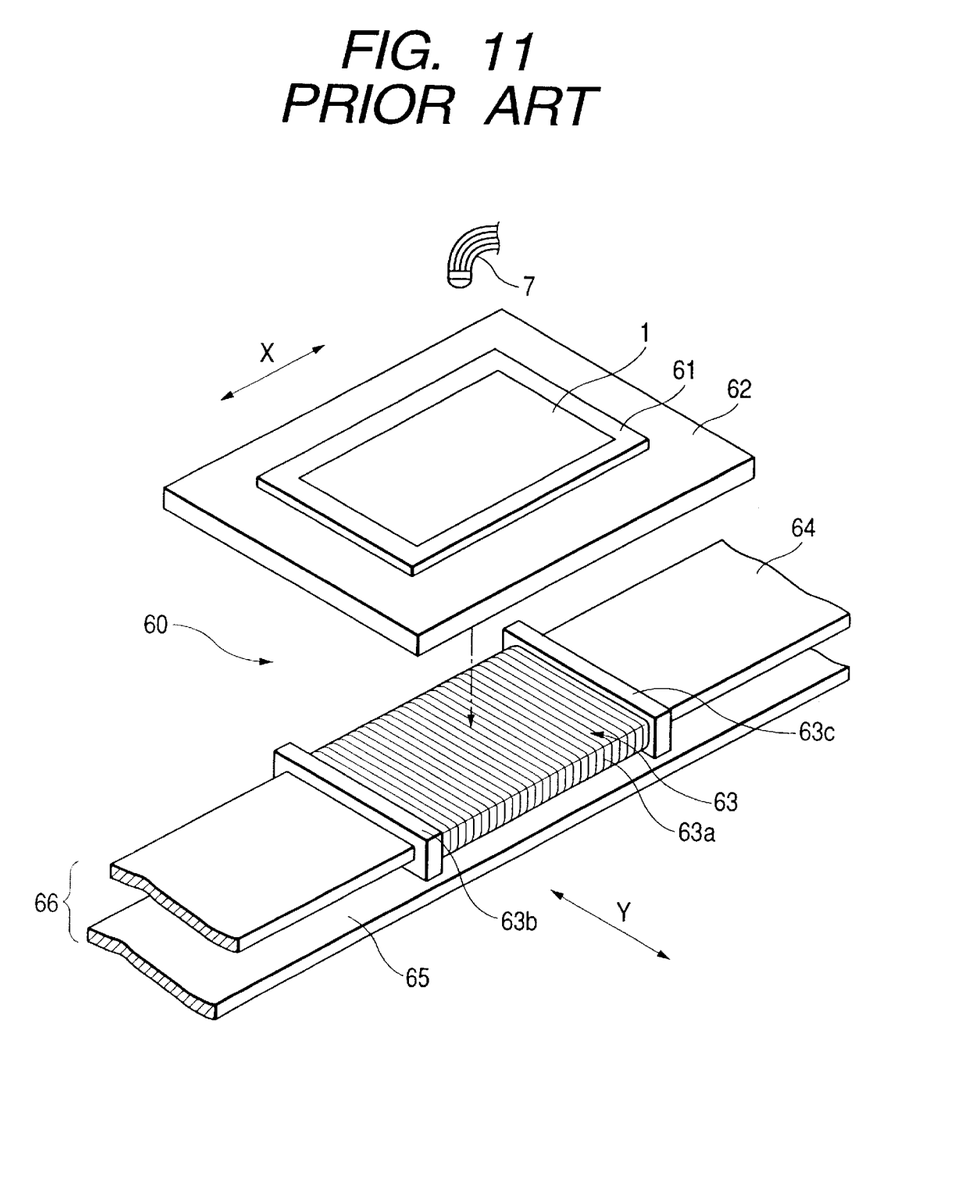
FIG. 11 is a perspective view (partially omitted) to illustrate a conventional moving device.

FIG. 11 illustrates a moving device 60 to move the color transfer support 1. This moving device 60 moves a part on which the color transfer support 1 is placed, and the laser irradiation device 7 is used always in a fixed state.

The moving device 60 is comprised of a support mount 62, a substrate absorbing plate 61, and a linear motor driving unit 66. Further, the linear motor driving unit 66 includes a coil body 63, a slide yoke 64, and a magnet 65. The substrate absorbing plate 61 is placed on the support mount 62, and the color transfer support 1 is absorbed and fixed on the substrate absorbing plate 61, while in use. And, the coil body 63 is a coil for a linear motor, in which a coil 63a is wound up on a bobbin. The upper sides of jaws 63b, 63c projected on both ends of the coil body 63 are fixed on the lower sides of the support mount 62.

In order to operate the moving device 60, controlling the direction of a magnetic force of the magnet 65 induces a force that acts on the coil body 63 in the sliding direction, and the force thereby moves the color transfer support 1 in a X direction, accompanied with the support mount 62.

Though not illustrated, a linear motor driving unit having the similar mechanism to the foregoing is provided on both the ends of the moving device 60, in order to move the entire body of the moving device 60 in a Y direction.

However, when the laser irradiation device 7 as shown in FIG. 9 is used, optical components (mirrors) intervening between the outgoing beam aperture 8a of the laser oscillator 8 and the irradiation point P are assembled and adjusted by a single optical axis; and therefore, not only the productivity is low, but also there has been created an abnormality of edges in the transfer pattern to the color transfer support 1 by the color ink layer 2, which is a problem.

That is, as recognized from the graph illustrated in FIG. 10, a displacement of the irradiation point P causes a difference in the intensity of the laser beams. Concretely, the graph shown in FIG. 10 is called as the Gaussian distribution, the intensity becomes highest at the center position C of the laser beams, and the intensity is s sharply weakened as the irradiation point is displaced from the center position C. In particular, to the color ink layer 2 transferred to the color transfer support 1, the laser beams are irradiated within the transfer width (irradiation width) L that is illustrated by the two dotted lines in FIG. 10, and the intensity at the edges become lowest within the transfer width L. Accordingly, the color ink layer 2 cannot be melted sufficiently at the edges, the intensity differences at the boundaries become high as well, the boundaries become unclear, and there has been created an abnormality of the edges in the transfer pattern.

On the other hand, when the moving device 60 as shown in FIG. 11 is used, a heat generated from the coil body 63 is transferred from the support mount 62 to the substrate absorbing plate 61, and further to the color transfer support 1; and thereby, there has been created an abnormality in the transfer accuracy of the color filter.

That is, a heat generated from the coil body 63 heats the color transfer support 1, which generates a temperature gradient on the surface of the color film sheet 50 disposed on the color transfer support 1. Thereby, the temperature of the center of the color transfer support 1 becomes high, whereby, the elongation of the center of the color transfer support 1 becomes large as compared to the other part thereof. When a transfer is conducted while the elongation is generated, the color filter (color ink layer 2) has created a displacement in the pitch thereof when the temperature reduces to a normal and the elongation is reduced to the original state.

The extent of displacement in the pitch becomes about 0.8 $\mu$m, when the temperature gradient of 1 degree per 100 mm is given. In practice, since there is the temperature difference of about 10 degree between the center of the color transfer support 1 and the edge thereof, there has been created an error of about 8 $\mu$m. In manufacturing the foregoing color filter, the pitch has to be arranged within the allowance of ±3 $\mu$m, and the foregoing moving device 60 can exceed this error range, which created a problem.

SUMMARY OF THE INVENTION

The present invention has been made to solve the foregoing problems, and it is therefore an object to provide a method of manufacturing a color filter, whereby a color filter whose transfer pattern has a clear edge and a high accuracy can be formed on the color transfer support and the efficiency of production can be enhanced, and a device of manufacturing the same.

The method of manufacturing a color filter of this invention includes the steps of: disposing a color film sheet having a color ink layer of a specific color of a plurality of colors on a color transfer support; irradiating laser beams simultaneously to a plurality of positions where a color pattern of a color of the color ink layer contained in the color film sheet is formed; melting the color ink layer at parts equivalent to a plurality of the color patterns to transfer to the color transfer support; and thereafter peeling the color film sheet from the color transfer support.

In this case, a color filter can be formed such that after the color filter of the specific color is transferred, the color film sheet having the color ink layer of a different color is disposed on the color transfer support, and an irradiation position of the laser beams is shifted to a position where the color pattern of the color of the color ink layer is transferred.

Further, the device of manufacturing a color filter is such that in a state that a color film sheet having a color ink layer of a specific color of a plurality of colors is disposed on a color transfer support, laser beams for melting the color ink layer are irradiated to the color film sheet, in which condensing lenses for irradiating laser beams that are spaced with a pitch whereby a color pattern of the specific color of a plurality of the colors can be formed, and are disposed so as to shift positions toward a scanning direction, and a plurality of optical fibers disposed to face the condensing lenses are mounted on a head; and optical paths of the laser beams generated from a plurality of laser oscillators are connected optically individually to the optical fibers mounted on the head.

To arrange the condensing lenses in the foregoing manner, or, for example, in a staggered state or obliquely linearly makes it possible to transfer adjoining color patterns only by moving in one direction. Therefore, the irradiation frequency and irradiation time can be reduced as compared with the conventional method, which leads to greatly increasing the productivity.

Preferably, the section of the optical fiber mounted on the foregoing head is made rectangular.

Owing to the foregoing means, a transfer pattern to the color film sheet becomes rectangular, and when a rectangular transfer pattern is requested, it is not necessary to prepare a special connecting unit for converting a round shape into a rectangular, thereby achieving a cost reduction.

Further, it is preferable to provide light-transforming means that unify energy distributions of the laser beams generated from the laser oscillators in the sectional direction of the optical paths. In this case, as the light-transforming means, coils made of the optical fibers o r optical expanders can be used.

When the light-transforming means by the former are used, the relation between the energy density and the transfer width becomes a top hat shape, and therefore, the laser beams having a uniform energy intensity can be irradiated to the color film sheet.

Even when the light-transforming means by the latter are used, the wavelength band near the center of the laser beams can be expanded; and therefore, the laser beams having an energy intensity unified at the center can be obtained.

By using the foregoing method, to irradiate laser beams having a uniform energy intensity facilitates to separate the boundaries between the heated parts and non-heated parts of the color ink layer. Thereby, a color filter whose transfer pattern has a clear edge can be acquired.

Further, the device may be provided with cooling means in the head.

The temperature variation in the head by the heat of the laser beams produces displacements in the pitches between the optical fibers in the head. Accordingly, the temperature in the head can be made constant by the cooling means to circulate, for example, a water of an ordinary temperature, other liquid, air, or other gas, which prevents the displacements in the pitches between the optical fibers in the head.

Further, the support mount to support the color transfer support can be made so that it can move in both the directions perpendicular to the head.

In this case, the support mount may be provided with a linear motor driving unit placed thereunder that moves the support mount and cooling means that blow a cooling medium to a coil of the linear motor driving unit.

Owing to the foregoing cooling means, the heat generated from the linear motor driving unit during operation will not be transferred to the color transfer support, which prevents the generation of temperature unevenness in the color transfer support. Therefore, it is possible to prevent that a transfer is conducted while the color film sheet is expanded, that the color film sheet is shrunk after the temperature reduces to an ordinary temperature, and that there are generated displacements in the pitches of the transfer patterns in the color filter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

Preferred embodiments of the present invention will hereafter be described in detail with reference to the accompanying drawings.

Figure 1:
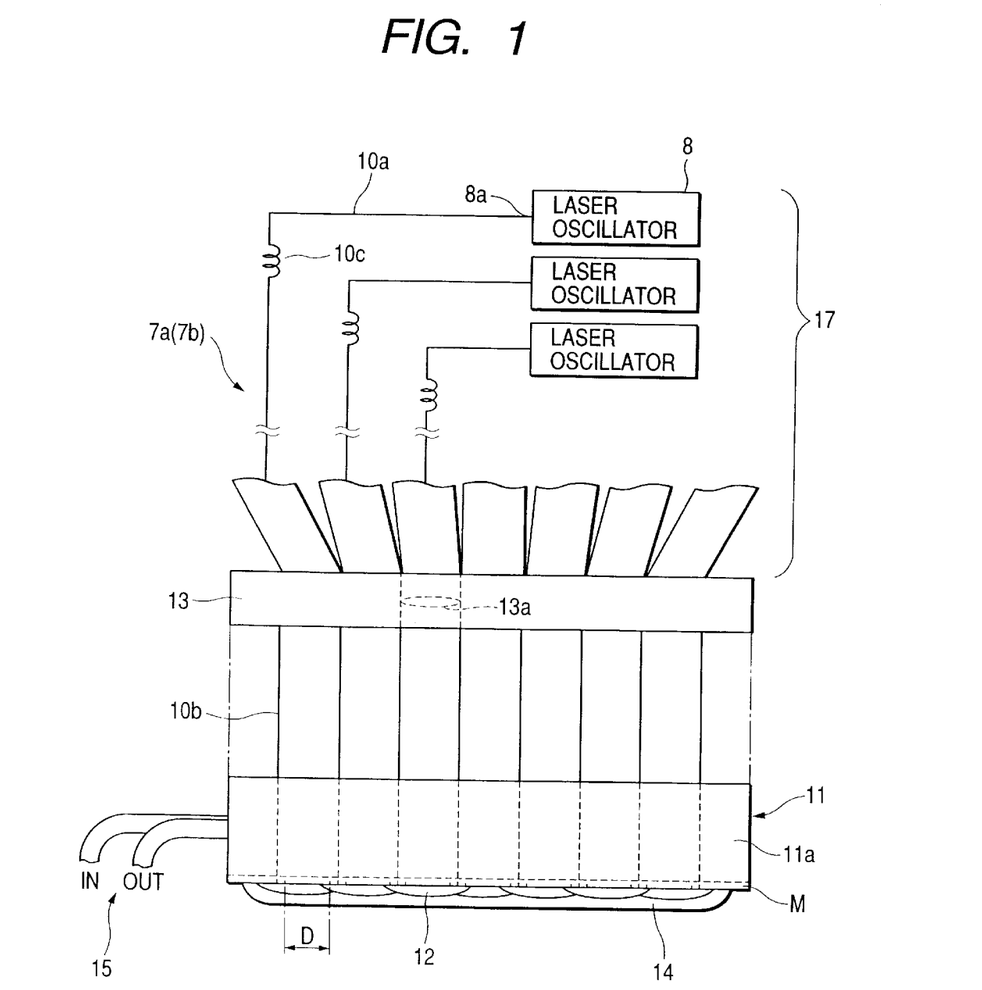
FIG. 1 is a schematic illustration of a laser irradiation device of one embodiment of the invention.
Figure 2:
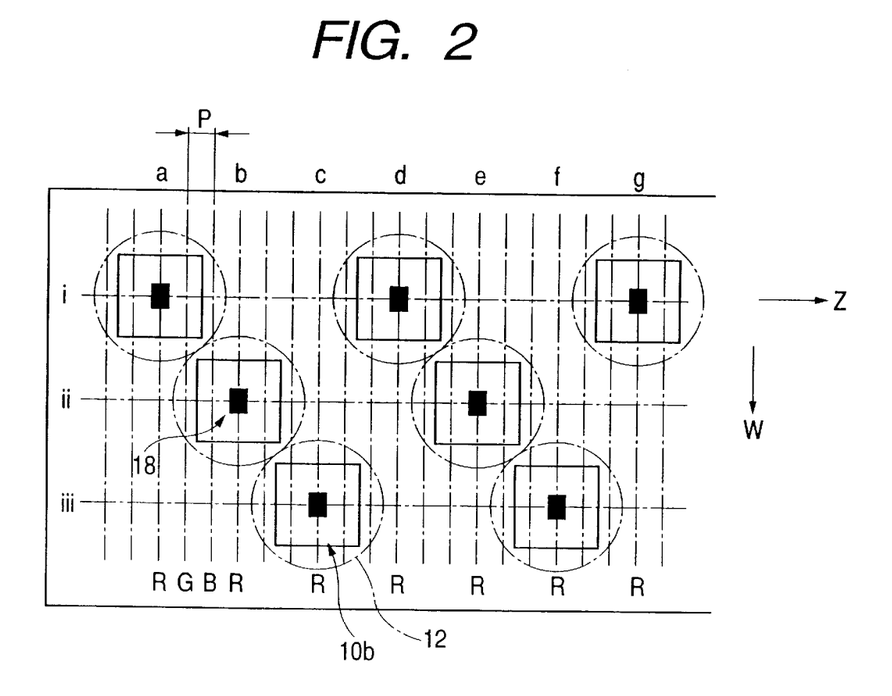
FIG. 2 is a plan view of a head that illustrates a layout of condensing lens of the embodiment.
Figure 3:
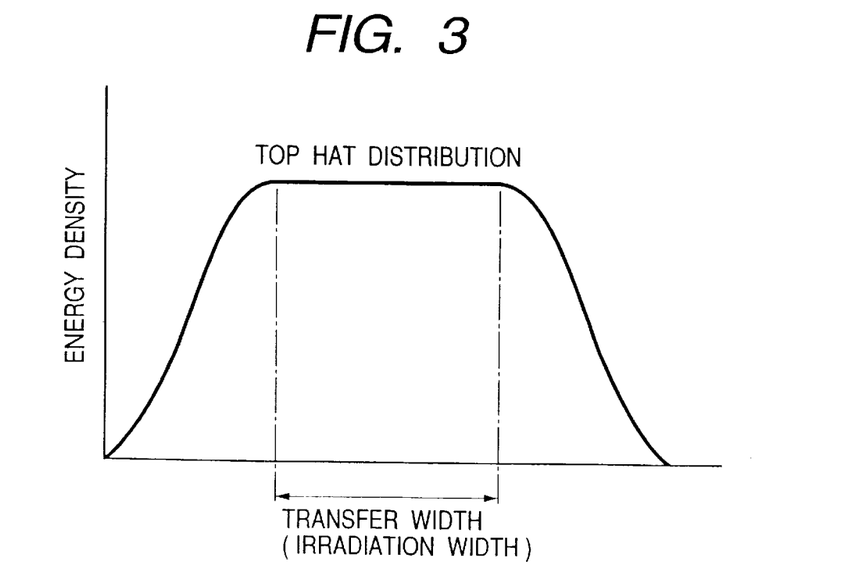
FIG. 3 is a graph to illustrate a relation between the transfer width and the energy density in the laser irradiation device of the embodiment.

FIG. 1 is a schematic illustration of a laser irradiation device of one embodiment of the invention, FIG. 2 is a partially omitted plan view that illustrates a layout of condensing lens of the embodiment, and FIG. 3 is a graph to illustrate a relation between the transfer width and the energy density in the foregoing laser irradiation device.

In this embodiment of the invention, a glass substrate is used as a color transfer support 1, however, it is not limited to a glass substrate, but a substrate made of other material such as an amorphous polymer transparent film can also be applied.

A laser irradiation device 7a as shown in FIG. 1 is provided with a laser generation unit 17, a joint unit 13, and a head unit 11.

The laser generation unit 17 includes a plurality of laser oscillators 8 and a plurality of optical fibers 10a each of which is connected to each other at the outgoing beam apertures 8a of laser beams.

The foregoing laser oscillators 8 integrate semiconductor laser elements, and it is preferable to use a semiconductor laser element of which wavelength is close to that of an infrared light, specially a semiconductor laser element emitting a red light. That is, the photothermal conversion layer 4 described later (see FIG. 6) formed in the color film sheet 50 has a property that is likely to absorb an infrared light, since it contains a carbon to assume a block color. Accordingly, the element as mentioned above is preferably used. As this type of semiconductor element, it is preferable to use, for example, the GaAs/GaAlAs system (wavelength $\lambda$=780 to 905 nm), InGaAsP system ($\lambda$=1.1 to 1.6 $\mu$m), or lead compound system $\lambda$=2.8 to 30 $\mu$m). The wavelength is preferably within 780 nm to 3 $\mu$m.

The optical fibers 10a have coils 10c formed by curling the fibers on the optical paths. Curling the optical fibers 10a in this manner will acquire a hat top distribution as shown in FIG. 3, that is, a uniform distribution of energy intensity near the center irradiated.

To irradiate the laser beams to the color film sheet 50 by using only the uniform intensity distribution will form the color ink layer 2 having a clear edge pattern on the color transfer support.

And, the optical fibers 10a from the laser oscillators 8 to the joint unit 13 can be formed of glass fibers of which sectional form is round ($\phi$ about 1 mm or 2 mm). On the other hand, since the irradiation pattern is rectangular (width 75 $\mu$m), as shown in FIG. 2, it is preferable to adopt the optical fibers of rectangular sectional form to the optical fibers 10b from the joint unit 13 to the head unit 11. The joint unit 13 is provided with the condensing lenses 13a for coupling that enable the laser beams transmitted through the optical fibers 10a to efficiently guide into the optical fibers 10b. Further, the glass fibers of sectional rectangular form may be used for all the foregoing optical fibers 10a and 10b. In that case, the condensing lenses 13a for coupling are not used, and the end faces of the fibers 10a are set in tight contact with those of the fibers 10b, thus forming the joint unit 13.

As mentioned above, by providing the joint unit 13, the transfer pattern can be altered appropriately as needed.

Figure 7:
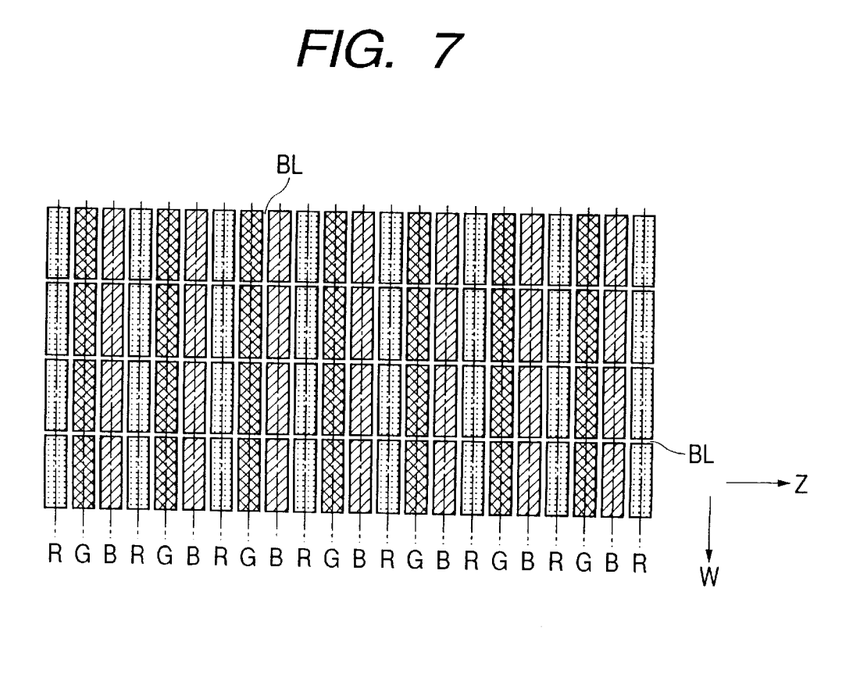
FIG. 7 is one example to illustrate a color pattern arrangement of colors of a color filter.

The foregoing head unit 11 is provided with irradiation condensing lenses 12 for condensing the laser beams into the front ends of the optical fibers 10b. As shown in FIG. 2 (plan view), the arrangement of the condensing lenses 12 in the lateral direction (Z direction) perpendicular to the scanning direction (W direction) is set to the same pitch [3P in FIG. 2; the pitch of the adjoining same color (for example, R) patterns to exclude G, B color patterns] as the arrangement pitch of the same color of the color filter to be manufactured, as shown in FIG. 7. However, to arrange the condensing lenses 12 with this pitch linearly in the Z direction will overlap the condensing lenses 12 each other, and overlap the optical fibers 10b each other as well. Accordingly, as shown in FIG. 2, the condensing lenses 12 and the optical fibers 10b are arranged to be displaced obliquely in the scanning direction (W direction).

In FIG. 2, three stages (three pairs of the condensing lenses 12 and the optical fibers 10b) are arranged as one set, each of the optical fibers 10b is disposed so as to face each of the condensing lenses 12, and the three stages are arranged to be staggered repeatedly in the Z direction. However, more than four stages (four pairs) may be arranged repeatedly.

Further, a mask to cut a part of the laser beams may be formed between the optical fibers 10b and the condensing lenses 12. That is, as shown in FIG. 3, to provide the coils 10c will form the energy distribution of the laser beams guided to the irradiation position into the top hat type and make the distribution uniform. Adopting this uniform part of the energy distribution as the irradiation width, in order to make this irradiation width equal to the transfer width of the color pattern of the color filter, a mask M may be provided so as to contract the beam width D of light propagating through the optical fibers 10b.

When laser beams are irradiated to the color film sheet 50 disposed on the color transfer support 1 by using the laser irradiation device 7a having the arrangement mentioned above, the color transfer support 1 on which the color film sheet 50 is disposed and the head unit 11 are relatively moved in the W direction. At that moment, to intermit the irradiation of laser beams transfers the color patterns of the same color (R, for example) intermittently continuously with a specific pitch in the W direction.

After finishing the scanning in the W direction, the position where the laser beams are irradiated is shifted toward the Z direction. The shift in the Z direction is one block, when the condensing lens group arranged in the Z direction as shown in FIG. 2 is regarded as one block. Then, the laser beams are scanned in the W direction on the color film sheet 50. To repeat the foregoing will transfer all the specific color patterns.

After completing the transfer of the specific color, for example, color R at the beginning, the color film sheet 50 having the G color ink layer 2 is disposed on the color transfer support 1. The relative position of the head unit 11 and the color transfer support 1 is shifted in the Z direction by one pitch P of the color pattern. Then, to carry out the foregoing transfer forms the G color pattern on the color transfer support 1. Further, the color film sheet 50 having the B color ink layer 2 is disposed on the color transfer support 1, the head unit 11 and the color transfer support 1 are relatively shifted in the Z direction by one pitch P, and the transfer is carried out.

Further, in the head unit 11, the optical fibers 10b generate a great amount of heat, besides the optical fibers 10b are bound to make the generated heat still more intense, which gives a thermal deformation to a plastic holder 11a to create drifts in the arrangement pitch of the optical fibers. For this countermeasure, the head unit 11 is provided with a cooling unit 15 that stabilizes the head temperature within about ±2° C.

The cooling unit 15 circulates a water, (or other liquid) of ordinary temperature, for example, and while monitoring the temperature of a water passed through the head unit 11 by a sensor, varies the water flow so as to make the water temperature constant. The foregoing cooling medium may be an air, or other type of gas.

In the laser irradiation device 7a formed as described above, normally the head unit 11 is placed perpendicularly to the color transfer support 1. However, the head unit 11 can be placed slant to thereby alter the pitch of the transfer pattern.

Further, the arrangement of the condensing lenses 12 in the head unit 11 is not limited to the staggered style as shown in FIG. 2. A slant linear arrangement may be applied, and various arrangements are possible. Further, as another embodiment of the manufacturing device of this invention, a laser irradiation device 7b in which the foregoing laser generation unit 17 is replaced by a laser generation unit 27 as shown in FIG. 4 may be applied.

Figure 4:
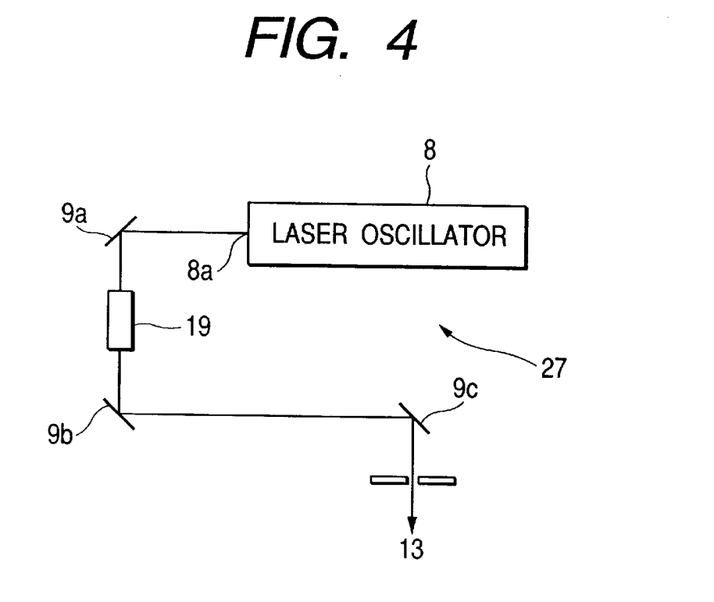
FIG. 4 is a schematic illustration of a laser irradiation device of another embodiment.

The laser generation unit 27 as shown in FIG. 4 is provided with laser oscillators 8 in which semiconductor elements are integrated, mirrors 9a, 9b, and 9c to guide laser beams from the outgoing beam apertures 8a to the joint unit 13, and optical expanders 19 placed on the optical paths. This optical expander 19 expands the wavelength band near the center of the laser beams so as to make the energy density within the irradiation width shown by the two dotted lines substantially uniform.

The color filter is formed on the color transfer support 1 by using the laser irradiation device 7a or 7b as above. The color filter is formed such that the color film sheet 50 described later is disposed in tight contact on the color transfer support 1 and the laser beams are irradiated thereon from above.

The color film sheet 50 as shown in FIG. 6 includes the base film 3, photothermal conversion layer 4, and color ink layer 2, which are laminated in this order. The base film 3 employs a drawn resin of a polyethylene terephthalate (PET) or the like that the stress is eased by a heat treatment.

Further, the photothermal conversion layer 4 employs an epoxy resin with a carbon powder added, which has a function to absorb light and convert it into heat. This photothermal conversion layer 4 assumes the block color system, and it is preferable from the light absorbing property. Further, the material of the photothermal conversion layer 4 is not limited to a mixture of a binder of an epoxy resin or the like and a carbon powder, and it may be an infrared absorbing organic material.

The color ink layer 2 employs a binder of an epoxy resin or the like with an ink or a pigment (cyan, for example) added thereto.

The foregoing color film sheet 50 is disposed in a tight contact on the color transfer support 1, laser beams are irradiated locally from above the base film 3 by using the laser irradiation device 7a or 7b. Then, the laser beams permeate through the base film 3 to be absorbed by the photothermal conversion layer 4. The color ink layer 2 is heated and melted by the exothermic action of the photothermal conversion layer 4, and only the heated part is transferred to the color transfer support 1. Since the color ink layer 2 except the heated part is not melted by that heat, it is not adhered on the color transfer support 1 and remains on the base color film 3.

Thereafter, to continue the transfer by the foregoing process will form a color filter of a specific color on the color transfer support 1, which has the arrangement of the color ink layer 2 as shown in FIG. 10. In the same manner, to sequentially dispose the color film sheet 50 of a different color from the above on the color transfer support 1 will transfer the color ink layer 2 on the color transfer support 1.

In consequence, a substrate can be obtained which has a color filter in which R, G, B are arranged with a specific pattern as shown in FIG. 7.

And, as shown in FIG. 7, a black matrix is formed on the surface of the color transfer support 1 as a preparation stage to form the color filter. After the color filter of each color is formed on the color transfer support 1, a black matrix BL for shielding gaps between colors is formed. This black matrix Br is formed such that a chrome thin film is formed and the thin film is patterned by using the photolithography.

Figure 5:
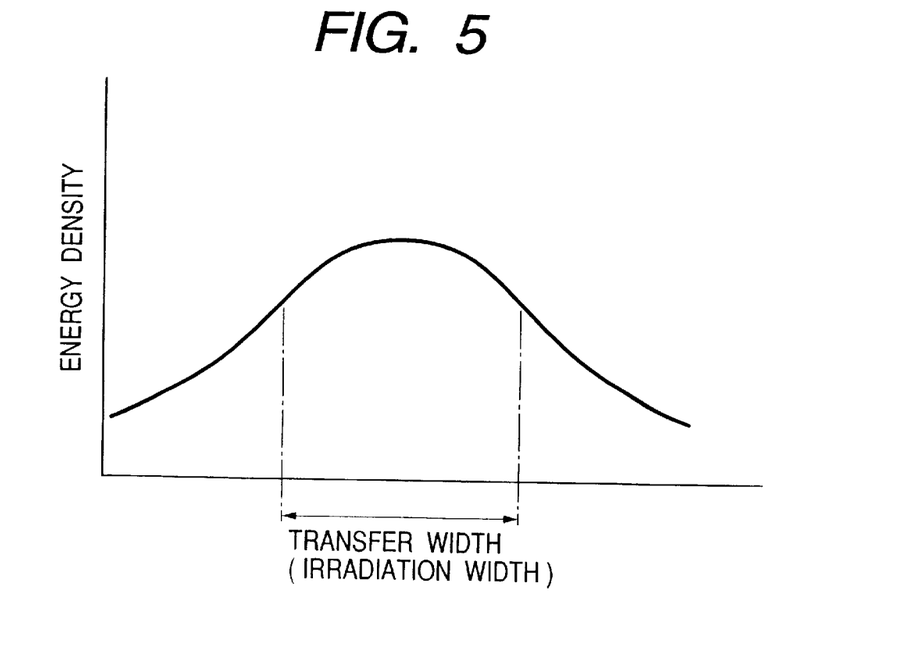
FIG. 5 is a graph to illustrate a relation between the transfer width and the energy density in the laser irradiation device of another embodiment.

As mentioned above, when the laser irradiation device shown by the symbol 7a is used, the laser beams having the energy intensity distribution shown in FIG. 3 are irradiated on the color film sheet 50 overlying the color transfer support 1. When the laser irradiation device shown by the symbol 7b is used, the laser beams having the energy intensity distribution shown in FIG. 5 are irradiated thereon. Thereby, only the heated part of the color film sheet 50 is irradiated with a uniform energy intensity, whereby the color ink layer 2 with the edges clearly separated is formed on the color transfer support 1.

On the other hand, in case the irradiation position of laser beams is shifted in the manufacturing device of this invention, the color transfer support 1 is designed to move.

Figure 8:
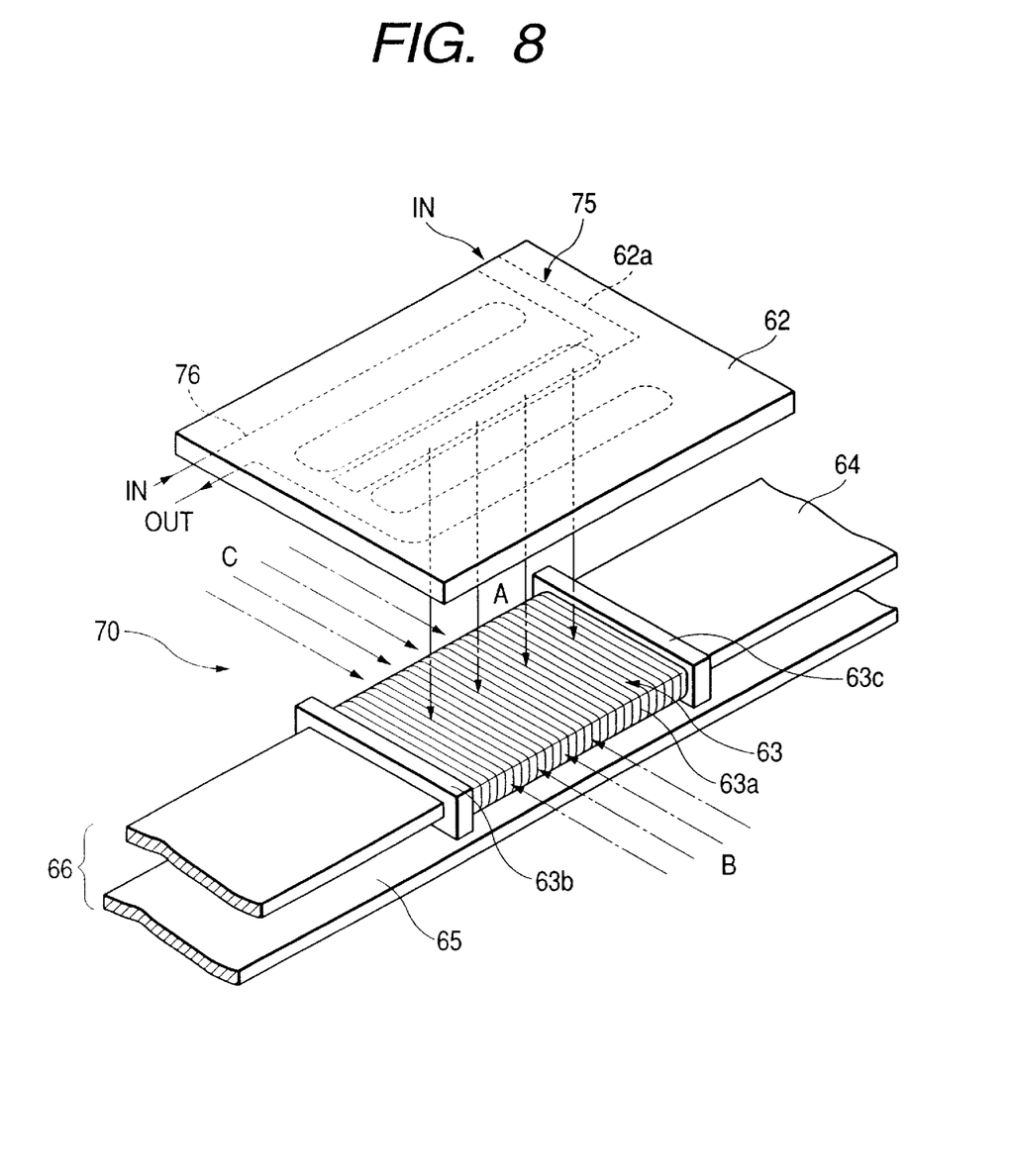
FIG. 8 is a perspective view (partially omitted) to illustrate a cooling mechanism of a moving device.

FIG. 8 illustrates a moving device 70 for this purpose. The moving device 70 is formed, in the same manner as shown in FIG. 11, of the support mount 62, the linear motor driving unit 66, and the substrate absorbing plate 61 (not illustrated). Further, the linear motor driving unit 66 includes the coil body 63, the slide yoke 64, and the magnet 65, in the same manner as shown in FIG. 11.

In the moving device 70, the coil body 63 generates a heat while moving, and the heat generated gives an adverse effect to the transfer accuracy of the color filter. Accordingly, the first and the second cooling means 75, 76 are provided to prevent the influence of heat.

As shown in FIG. 8, the first cooling means 75 includes an air passage 62a formed in the support mount 62, and a plurality of air ejecting holes formed on the lower face of the air passage 62a. The air injected into the air passage 62a is blown onto the upper face of the coil body 63 from the air ejecting holes, thereby cooling the coil body. If necessary, the air may be blown to the coil body 63 from the sides (B and C directions in FIG. 8). And, as a cooling medium except an air, a usual cooling gas can be used.

The support mount 62 is provided with the second cooling means 76, in which a piping is made inside the support mount 62 to circulate the cooling medium such as a water. Further, the support mount 62 may be made of a heat insulating material.

The foregoing cooling means 75, 76 prevent the heat generated from the coil body 63 during operation from transferring through the support mount 62 to the color transfer support 1.

Further, in the manufacturing device of the invention, a protective coat 14 can be formed on the surface of the condensing lenses 12 of the laser irradiation device 7a or 7b (see FIG. 1).

This protective coat 14 is formed such that a wear resistant material of a high permeability to the wavelength of the laser beams is coated on the surface of the condensing lenses 12 and is pressurized under control at the same time of the laser beams being irradiated.

To bring the protective coat 14 in tight contact with the color film sheet 50 and move the color transfer support 1 and the color film sheet 50 overlying it relatively to the head unit 11 will enhance the adhesiveness between the color ink layer 2 and the color transfer support 1. Further, to appropriately vary the thickness of the protective coat 14 will set the focal length accurately. Incidentally, the thickness of the protective coat 14 is preferably about 500 Å to 5 µm.

Preferably, the protective coat 14 as mentioned above employs a transparent or translucent material having a wavelength of about 0.4 to 4 µm, and $SiO_2$ and ceramic, for example, are typical for the material.

As the foregoing ceramic, the following can be listed:

translucent alumina with MgO, $Y_2O_3$, $La_2O_3$, $ZrO_2$, etc. doped; MgO with LiF, NaF, etc. doped; and $MgAl_2O_3$, $Y_2O_3$, or ZnO. These materials are formed into films as needed by the spattering or CVD method, or the like.

A glass substrate is used for the color transfer support 1 on which a color filter is formed as mentioned above. This glass substrate is laminated to another glass substrate, and materials for liquid crystal are filled in the gap between both the glass substrates, thus forming a liquid crystal cell.

The method and the device of manufacturing a color filter of this invention are able to irradiate the laser beams having a uniform intensity to a color film sheet, and using the cooling means, they are able to prevent of generating a temperature unevenness in the head unit having each head arranged with a constant pitch and the color transfer support; and thereby, they are able to form a color filter whose transfer pattern has a clear edge and a high accuracy on the color transfer support. Further, altering the arrangement of the condensing lenses in the head unit can reduce the irradiation frequency and time, which leads to improving the production efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device of manufacturing a color filter, in which, in a state that a color film sheet having a color ink layer of a specific color of a plurality of colors is disposed on a color transfer support, laser beams for melting the color ink layer are irradiated to the color film sheet, the device comprising:

condensing lenses for irradiating laser beams that are spaced with a pitch whereby a color pattern of the specific color of a plurality of the colors can be formed, and are disposed so as to shift positions toward a scanning direction, and a plurality of optical fibers disposed to face the condensing lenses are mounted on a head; and optical paths of the laser beams generated from a plurality of laser oscillators are connected optically individually to the optical fibers mounted on the head.

2. A device of manufacturing a color filter according to claim 1, wherein a section of the optical fiber mounted on the head is rectangular.

3. A device of manufacturing a color filter according to claim 2, wherein light-transforming means are placed to unify energy distributions of the laser beams generated from the laser oscillators in the sectional direction of the optical paths.

4. A device of manufacturing a color filter according to claim 3, wherein the light-transforming means are coils made of the optical fibers.

5. A device of manufacturing a color filter according to claim 3, wherein the light-transforming means are optical expanders.

6. A device of manufacturing a color filter according to claim 5, wherein cooling means to circulate a cooling medium in the head are provided.

7. A device of manufacturing a color filter according to claim 6, wherein a support mount to support the color transfer support is movable in both directions perpendicular to the head.

8. A device of manufacturing a color filter according to claim 7, wherein the support mount is moved by a linear motor driving unit placed thereunder, and the support mount is provided with cooling means to blow a cooling medium to a coil of the linear motor driving unit.

9. A device of manufacturing a color filter according to claim 1, wherein light-transforming means are placed to unify energy distributions of the laser beams generated from the laser oscillators in the sectional direction of the optical paths.

10. A device of manufacturing a color filter according to claim 9, wherein the light-transforming means are coils made of the optical fibers.

11. A device of manufacturing a color filter according to claim 9, wherein the light-transforming means are optical expanders.

12. A device of manufacturing a color filter according to claim 11, wherein cooling means to circulate a cooling medium in the head are provided.

13. A device of manufacturing a color filter according to claim 12, wherein a support mount to support the color transfer support is movable in both directions perpendicular to the head.

14. A device of manufacturing a color filter according to claim 13, wherein the support mount is moved by a linear motor driving unit placed thereunder, and the support mount is provided with cooling means to blow a cooling medium to a coil of the linear motor driving unit.

15. A device of manufacturing a color filter according to claim 1, wherein cooling means to circulate a cooling medium in the head are provided.

16. A device of manufacturing a color filter according to claim 15, wherein a support mount to support the color transfer support is movable in both directions perpendicular to the head.

17. A device of manufacturing a color filter according to claim 16, wherein the support mount is moved by a linear motor driving unit placed thereunder, and the support mount is provided with cooling means to blow a cooling medium to a coil of the linear motor driving unit.

18. A device of manufacturing a color filter according to claim 1, wherein a support mount to support the color transfer support is movable in both directions perpendicular to the head.

19. A device of manufacturing a color filter according to claim 18, wherein the support mount is moved by a linear motor driving unit placed thereunder, and the support mount is provided with cooling means to blow a cooling medium to a coil of the linear motor driving unit.

* * * * *